Aug. 28, 1934.  R. R. RAND, JR  1,971,835
POOL CONSTRUCTION
Filed March 31, 1932
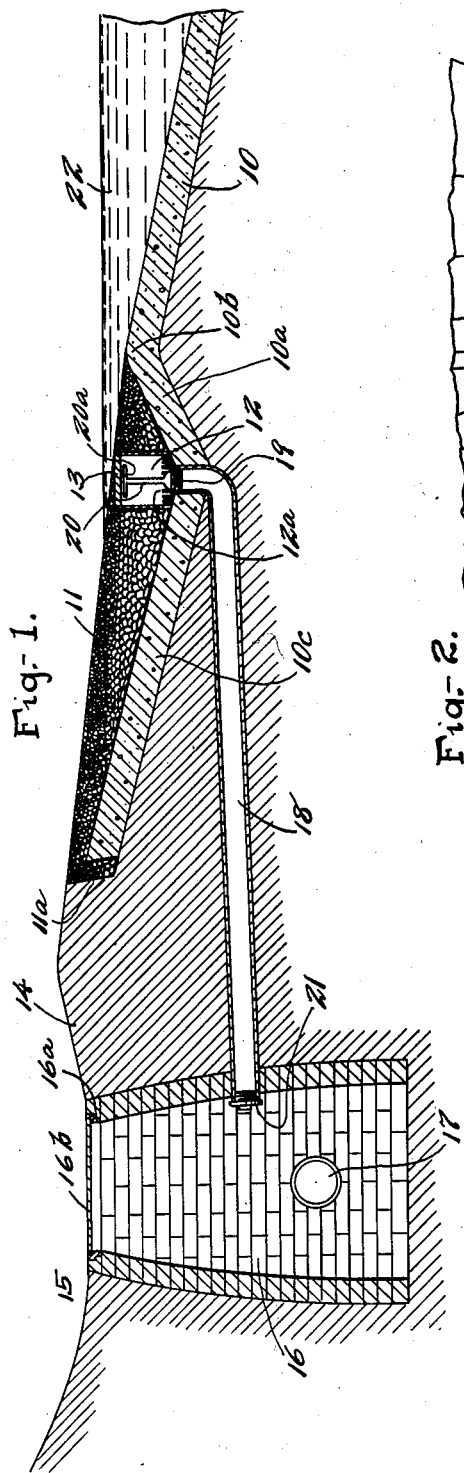
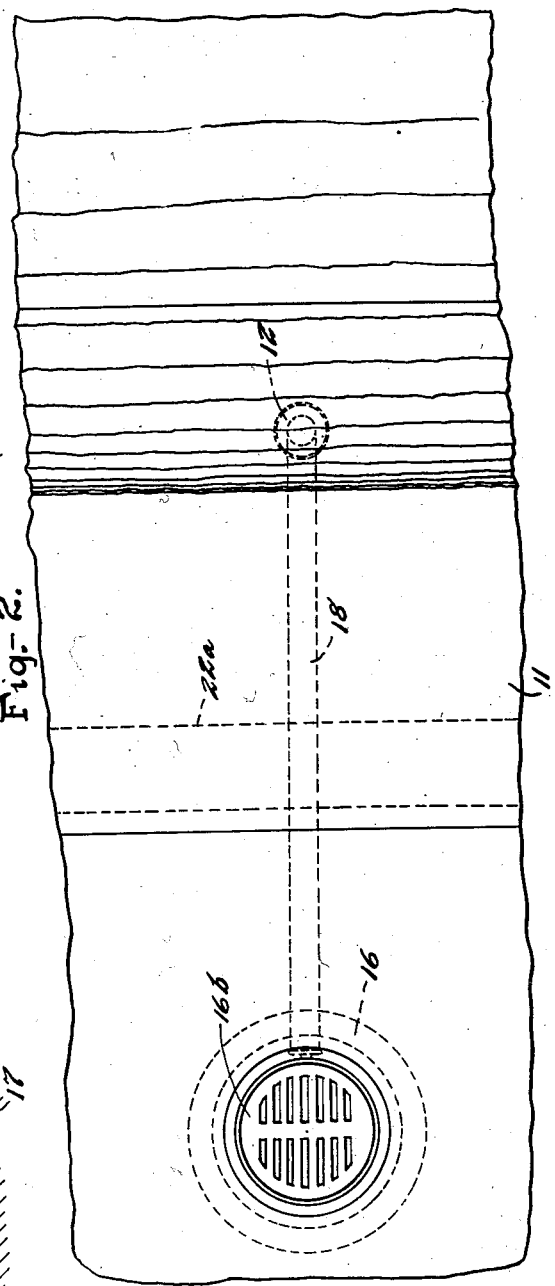
Inventor
Rufus R. Rand Jr.
By *Reif & Braddock*
Attorneys.

Patented Aug. 28, 1934

1,971,835

UNITED STATES PATENT OFFICE 1,971,835

POOL CONSTRUCTION

Rufus R. Rand, Jr., Wayzata, Minn.

Application March 31, 1932, Serial No. 602,212

15 Claims. (Cl. 4—172)

This invention relates to a construction of pool such as a swimming or bathing pool, and while the invention is applicable to various pools, it particularly is designed for a pool located out of doors. Bathing or swimming pools and other pools located out of doors are now more or less commn on large estates. One objection to such pools has been that a scum forms on the water, due to the growth of fungus and other life in the water, and it has been difficult to keep the shore line or the shore adjacent the edge of the water in clean and attractive condition. If there are trees about the pool, there is usually some surface debris caused by the leaves and twigs from the trees, and there is always more or less surface debris carried into the pool by the wind. There is always more or less breeze or wind, and the scum or other surface debris is carried to the shore by the breeze and the waves or wavelets produced thereby.

It is an object of this invention, therefore, to provide a structure of pool by means of which the scum or other surface debris will be deposited so that it can be readily washed away and a clean and attractive shore or beach maintained.

It is a further object of the invention to provide a structure of pool having a portion adjacent its edge in which is contained a body of material of hard particles or pieces having interstices therebetween, which body of material is adapted to receive the scum or surface debris and through which it may be washed downward to a suitable drain.

It is still another object of the invention to provide a construction of pool comprising a basin having a bottom sloping upwardly toward the shore of said pool, said bottom adjacent the shore sloping downwardly somewhat sharply for a short distance to form a hump and then again sloping upwardly to the shore, thus forming a recess at the outer side of said hump, and a body of gravel-like material in said recess, the normal level of water in said pool intersecting the surface of said body of material, and a drain leading from the bottom of said recess whereby the scum and surface debris will collect on said body of material and may be washed downwardly therethrough to said drain.

It is still another object of the invention to provide a structure as set forth in the preceding paragraph, in which said body of gravel-like material at the bottom of said recess comprises particles quite large in size, the particles decreasing to a relatively small size at the surface of said body of material.

It is still further an object of the invention to provide a pool construction comprising a basin having a bottom, said bottom being formed with a recess adjacent the shore in which a body of material comprising hard particles having interstices therebetween is disposed, the shore beyond said body of material preferably being formed with a depression, a sump located in this depression, and a drain means leading from the bottom of said recess to said sump.

These and other objects and advantages of the invention will be fully set forth in the following description made in connection with the accompanying drawing, in which like reference characters refer to similar parts throughout the several views, and in which:—

Fig. 1 is a vertical section taken through the edge of the pool and the shore adjacent the pool; and Fig. 2 is a plan view of a portion of the pool adjacent the portion shown in Fig. 1.

Referring to the drawing, a portion of the pool is shown comprising a basin having a bottom 10. It will be understood that the pool may be of any desired shape or configuration. The bottom 10 as shown in Fig. 1 slopes upwardly toward the edge of the pool or the shore. At a point adjacent the shore the bottom 10 again slopes downwardly, as shown at 10a, and thus forms what might be referred to as a hump 10b. The portion 10a is of some little extent and the bottom 10 thus again slopes upwardly to its edge as shown at 10c. The portions 10a and 10c thus form a recess or trough adjacent the edge of the pool and this recess is filled with a mass of material 11 of hard particles such as stones. The particles or stones in the material 11 preferably are rather large at the bottom of the recess, preferably several inches in diameter, and said particles or stones diminish in size toward the top surface of said body, the particles at the top of the body being quite small, such as the size of fine roofing gravel. A smooth surface is thus formed at the top of the material 11, having a sand-like effect and being quite smooth and pleasant to walk upon with bare feet. The material 11 is shown as extending down at the end of the portion 10c to the bottom of said portion as shown at 11a. A well 12 is shown in said recess, which well extends to the bottom thereof and the same is shown as formed by a casing having a plurality of vertical slots 12a at its bottom. An easily removable cover 13 is shown for the well 12 and this cover is below the top of the body of material 11, so that said material extends thereover. Beyond the body of material 11 the shore 14 is formed with a depression 15 and a sump or sink 16 is shown as located in this depression. While different forms of a sump or sink may be used, in the embodiment of the invention illustrated the sump 16 is shown as a cistern of general frusto-conical shape, formed of bricks. Sump 16 is provided with a rim 16a at its top, preferably of metal, and a cover 16b also preferably of metal is provided, which cover preferably will have holes or slots therethrough. A drain pipe 17 leads from the sump 16 to some suitable sewer or other carry-off means. A drain conduit 18 extends from the bottom of the recess formed by portions 10a and 10c of the bottom 10 and communicates with the bottom of well 12. The end of conduit 18 extending from the well is normally closed by a threaded plug or cap 19. This cap or plug has a flange extending over the top edge of pipe 18 and is slotted or otherwise constructed to be engaged by the end of a wrench 20 disposed in well 12 and provided with an operating handle 20a disposed closely beneath the cover 13. The conduit 18 is provided with a similar plug or cap 21 at its end communicating with the sump 16, which cap is accessible from the inside of said sump or cistern 16. The water of the pool is indicated at 22, and it will be seen that the top of this water or the water level intersects the surface of the material 11. The material 11 is, of course, pervious to water, that is, the water passes into the interstices between the particles of said material and the edge of the water on the portion 10c is indicated by the dotted line 22a in Fig. 2.

In operation, if any scum or debris collects on the surface of the water 22, the same will be propelled to the shore by the breeze or wind and by the wavelets caused thereby, and will be deposited upon the material 11. When the debris so collects on the material 11, the same will be cleaned at desirable intervals. This is done by lowering the water level below the top of the hump 10b. This, of course, can be readily done by opening a drain with which such pools are provided. The material 11 is then pushed aside from the cover 13 and said cover removed. Wrench 20 is then operated to remove the plug 19. Said wrench and cap are then removed, as is also the cap 21. A stream of water from a hose is then played upon the material 11 and the scum and other fine surface material is washed down between the particles of said material and passes into the well 12 and out through the drain 18 to the sump 16. The material 11 is thus soon washed bright and clean and made entirely free of any objectionable material. If there are any leaves, twigs, or large pieces of debris, this can easily be removed with a rake. When the material 11 is thus washed and cleaned from the objectionable material, the caps 19 and 21 are again replaced, as is also the cover 13. The fine material at the top of the body of material 11 is then again placed over the cover 13 and the pool is in fresh and clean condition. The depression 15 is provided to prevent surface drainage into the pool, and any drainage into the depression can run into the sump 16 through the slots or holes in the cover 16a. It will be understood that any desired number of sumps 16 and wells 12, as well as the drain conduits 18, may be provided, and if desired, the shore between the sumps 16 will slope toward the same and the bottom portions between wells 12 may also slope somewhat toward said wells. The water and material washed through material 11 can be pumped from the sump 16 if desired.

The shallow water adjacent hump 10b will prevent any wave of considerable size passing too far toward the shore to cause washing of the material 11.

From the above description it is seen that applicant has provided a very simple and yet very effective structure of pool and one which can be easily kept in clean, sanitary, and attractive condition. The objectionable matter collecting on the water is easily washed down through the material 11 and at the same time said material forms a desirable and attractive beach or shore for the pool. It will be noticed that the material 11, when the pool is at the normal level, extends downwardly beneath the water some distance. This gives a beautiful and pleasing effect. The structure is quite simple and can be made without great additional expense. The construction has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. A pool construction comprising a basin having a bottom, said bottom adjacent the edge of said pool extending downwardly a short distance and then sloping upwardly to its edge to form a recess adjacent the edge of said pool, a body of material in said recess having interstices therein, the water level in said pool intersecting the surface of said body of material, whereby scum or other debris on said water will be deposited on said body and may be washed down through the same and means below said recess through which said material may pass.

2. The structure set forth in claim 1, the separate particles of said material being quite large at the bottom of said recess and diminishing in size toward the top surface thereof.

3. A pool construction comprising a basin having a bottom, said bottom having a hump adjacent its edge portion and having a recess beyond and formed partly by said hump adjacent the edge of said pool, a body of material having interstices therein in said recess and extending to the shore beyond the water edge of said pool, said water level being normally above said hump, whereby scum or surface debris in said pool will be deposited on said body and may be washed down through said gravel-like material and means at the bottom of said recess through which said material may be removed.

4. The structure set forth in claim 3, the shore extending from and beyond said recess and said body of material being provided with a depression a short distance from said recess and material to prevent drainage into said pool, and a sump located in said depression.

5. A pool construction comprising a basin having a bottom extending upward toward the shore to a line adjacent the same, and then sloping downwardly a short distance to form a hump and then sloping upwardly to the shore, thus forming a recess adjacent the shore, the normal water level of said pool being somewhat above said hump, and a mass of stone in said recess varying from several inches in diameter at the bottom to fine gravel at the top, and a drain means leading from the bottom of said recess.

6. A pool having means defining and forming a recess about its edge, the inner portion of said means defining said recess being below the normal water line, a body of material having interstices therein disposed in said recess, the surface of said material extending from beneath the water of said pool outwardly some distance, and a drain means leading from said recess.

7. A pool construction comprising a basin having a portion formed as a recess adjacent the edge of said pool and a body of material having interstices therein disposed in said recess and sloping upwardly from beneath the water of said pool, and a drain means leading from the bottom of said material whereby debris gathering on said material can be washed downwardly therethrough.

8. A pool construction comprising a basin having a bottom with means adjacent the edge of said basin holding a mass of material having interstices therein and a comparatively smooth top surface, a part of said surface extending beneath the normal water surface of said pool and engaged by the water of said pool, and a normally closed drain means leading from said first mentioned means.

9. A pool construction comprising a basin having a bottom, said bottom having a hump adjacent its edge portion and having a recess beyond said hump adjacent the edge of said pool, a body of material having interstices therein in said recess and extending to the shore beyond the water edge of said pool, said water level being normally above said hump, whereby scum or surface debris in said pool will be deposited on said body and may be washed down through said material, a drainage well in said recess substantially at its deepest portion, a cover for said well, and a drain leading from the bottom of said well.

10. A pool construction comprising a bottom having an elevated portion adjacent the edge of said pool forming with the portion outside and contiguous thereto a recess, the top of said elevated portion being disposed below the water level of said pool, a mass of granular material in said recess having interstices between the particles thereof in said recess, and normally closed means leading from the bottom of said recess through which material collecting in said recess may pass.

11. The structure set forth in claim 10, the surface of said material sloping upwardly from beneath the water level of said pool to a point an appreciable distance beyond the shore line of said pool.

12. A pool construction comprising a basin having a bottom, said bottom having a hump adjacent its edge portion and having a recess beyond and formed partly by said hump adjacent the edge of said pool, a body of material having interstices therein in said recess and extending to the shore beyond the water edge of said pool, said water level being normal above said hump whereby scum or surface debris in said pool will be deposited on said body and may be washed down through said material, the shore of said pool beyond said body of material having a depression therein, a sump located in said depression, and a drain leading from the bottom of said recess into said sump.

13. A pool construction comprising a basin having a body, a raised portion in said bottom adjacent the edge thereof, said basin having a recess therein beyond said raised portion and formed partly by said portion, said bottom sloping upwardly in said recess toward the shore, the normal water level of said pool being somewhat above said raised portion, and a mass of material having interstices therein disposed in said recess, extending below and above the water level in said pool.

14. In a pool having a recess formed in its bottom adjacent its edge and a body of material with interstices therein disposed in said recess having a surface extending from beneath the water in said pool to a point beyond the water line at the edge of said pool, the method of cleaning the shore of said pool which consists in lowering the water line of said pool, washing scum and dirt collected on said surface down through said material, and removing said scum and dirt from the bottom of said recess.

15. In a pool comprising a basin having a bottom with a hump therein adjacent its edge, said basin having a recess therein beyond and formed partly by said hump, a body of gravel-like material disposed in said recess, said material thus having interstices between the particles thereof, the surface of said material extending beyond the water line and the water level normally being above the top of said hump, the method of cleaning the shore of said pool which consists in lowering the water level below the top of said hump, washing scum and dirt collected on said surface down through said gravel-like material, and removing said scum and dirt from the bottom of said recess.

RUFUS R. RAND, Jr.